(12) United States Patent
Mills et al.

(10) Patent No.: US 11,474,897 B2
(45) Date of Patent: Oct. 18, 2022

(54) TECHNIQUES FOR STORING DATA TO ENHANCE RECOVERY AND DETECTION OF DATA CORRUPTION ERRORS

(71) Applicant: Nvidia Corporation, Santa Clara, CA (US)

(72) Inventors: Peter Mills, Santa Clara, CA (US); Michael Sullivan, Santa Clara, CA (US); Nirmal Saxena, Santa Clara, CA (US); John Brooks, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/355,309

(22) Filed: Mar. 15, 2019

(65) Prior Publication Data

US 2020/0293395 A1    Sep. 17, 2020

(51) Int. Cl.
 *G06F 11/00* (2006.01)
 *G06F 11/10* (2006.01)
 *G06F 3/06* (2006.01)

(52) U.S. Cl.
 CPC ............ *G06F 11/10* (2013.01); *G06F 3/0619* (2013.01); *G06F 3/0659* (2013.01); *G06F 3/0673* (2013.01)

(58) Field of Classification Search
 CPC ...... G06F 11/10; G06F 3/0619; G06F 3/0659; G06F 3/0673; G11B 20/1809; G11B 2020/184; G11B 20/1866; H03M 13/27
 USPC .................................. 714/746, 752, 785, 767
 See application file for complete search history.

(56) References Cited

U.S. PATENT DOCUMENTS

| | | | | |
|---|---|---|---|---|
| 6,681,362 B1* | 1/2004 | Abbott | .................. | H03M 13/05 714/755 |
| 10,177,794 B1* | 1/2019 | Rahul | ............... | H03M 13/1575 |
| 2006/0265634 A1* | 11/2006 | Silvus | ............... | H03M 13/2966 714/784 |
| 2007/0104225 A1* | 5/2007 | Mizuochi | .......... | H03M 13/2707 370/476 |
| 2007/0110178 A1* | 5/2007 | Su | ........................ | H04L 27/2647 375/260 |
| 2009/0307561 A1* | 12/2009 | Kanaoka | ............ | G11B 20/1866 714/752 |
| 2012/0079340 A1* | 3/2012 | Gunnam | ........... | H03M 13/2732 714/752 |
| 2012/0099670 A1* | 4/2012 | Gunnam | ............... | H04L 1/0052 375/295 |

(Continued)

*Primary Examiner* — Albert Decady
*Assistant Examiner* — Osman M Alshack

(57) ABSTRACT

Often there are errors when reading data from computer memory. To detect and correct these errors, there are multiple types of error correction codes. Disclosed is an error correction architecture that creates a codeword having a data portion and an error correction code portion. Swizzling rearranges the order of bits and distributes the bits among different codewords. Because the data is redistributed, a potential memory error of up to N contiguous bits, where N for example equals 2 times the number of codewords swizzled together, only affects up to, at most, two bits per swizzled codeword. This keeps the error within the error detecting capabilities of the error correction architecture. Furthermore, this can allow improved error correction and detection without requiring a change to error correcting code generators and checkers.

10 Claims, 7 Drawing Sheets

(56) References Cited

U.S. PATENT DOCUMENTS

| | | | |
|---|---|---|---|
| 2012/0204079 A1* | 8/2012 | Takefman | G06F 3/0619 |
| | | | 714/758 |
| 2014/0195765 A1* | 7/2014 | Abali | G06F 11/1008 |
| | | | 711/168 |
| 2014/0281680 A1* | 9/2014 | Nemazie | G06F 11/1008 |
| | | | 714/6.1 |
| 2017/0024162 A1* | 1/2017 | Lim | G11C 29/52 |
| 2018/0121287 A1 | 5/2018 | Wasserman et al. | |

* cited by examiner

TECHNIQUES FOR STORING DATA TO ENHANCE RECOVERY AND DETECTION OF DATA CORRUPTION ERRORS

GOVERNMENTAL RIGHTS

This invention was made with Government support under DOE Contract No. DE-AC52-07NA27344 and Lawrence Livermore National Laboratory Subcontract No. B620719. The Government has certain rights in this invention.

TECHNICAL FIELD

This application is directed, in general, to storing data and retrieving data from memory, and, more specifically to correcting and detecting errors of data stored in memory.

BACKGROUND

Employment of error correction codes is a pivotal part of modern computer systems. Error correction codes are used to detect and correct errors by adding bits, called parity bits, to data bits when transmitting. The data bits and the parity bits form a codeword. One class of such error correction code is single error correction double error detection (SECDED), which is employed in modern computer architectures. SECDED is a common type of error correcting code that allows a single-bit error to be corrected and double-bit errors to be detected. SECDED is often used for protecting the data stored in memory from errors. While SECDED as typically applied can handle single and double bit errors, this error correcting code can nonetheless entirely miss, or even mis-correct, some multi-bit (N) errors when the number of errors in a codeword is greater than two.

SUMMARY

A first aspect provides an error correction code (ECC) apparatus, comprising: a first data swizzler configured to swizzle a plurality of data units to form a plurality of swizzled data units; an ECC generator configured to generate a plurality of error correction bits, at least one error correction bit of the plurality of error correction bits generated from each of the plurality of swizzled data units received from the first data swizzler; and an ECC swizzler configured to swizzle the plurality of error correction bits to form a plurality of swizzled error correction bits and thereby forming a plurality of swizzled codewords, where each swizzled codeword includes one of the plurality of data units and at least one swizzled error correction bit of the plurality of swizzled error correction bits.

A second aspect provides a memory controller that employs an error correction code (ECC), comprising: a data swizzler configured to generate, a plurality of swizzled data units from a plurality of data units; an ECC generator configured to generate a plurality of error correction bits from the plurality of data units; and an ECC swizzler configured to generate a plurality of swizzled error correction bits from the plurality of error correction bits, thereby forming a plurality of swizzled codewords, where each swizzled codeword includes one of the plurality of swizzled data units and at least one swizzled error correction bit of the plurality of swizzled error correction bits.

A third aspect provides a method, comprising: swizzling a plurality of data units to generate a plurality of swizzled data units; performing error correction coding on the swizzled data units to create a plurality of error correction bits; swizzling the plurality of error correction bits to generate a plurality of swizzled error correction bits; and storing the plurality of data units and the plurality of swizzled error correction bits, wherein the storing creates a plurality of swizzled codewords.

BRIEF DESCRIPTION

Reference is now made to the following descriptions taken in conjunction with the accompanying drawings, in which.

Figure 2A:
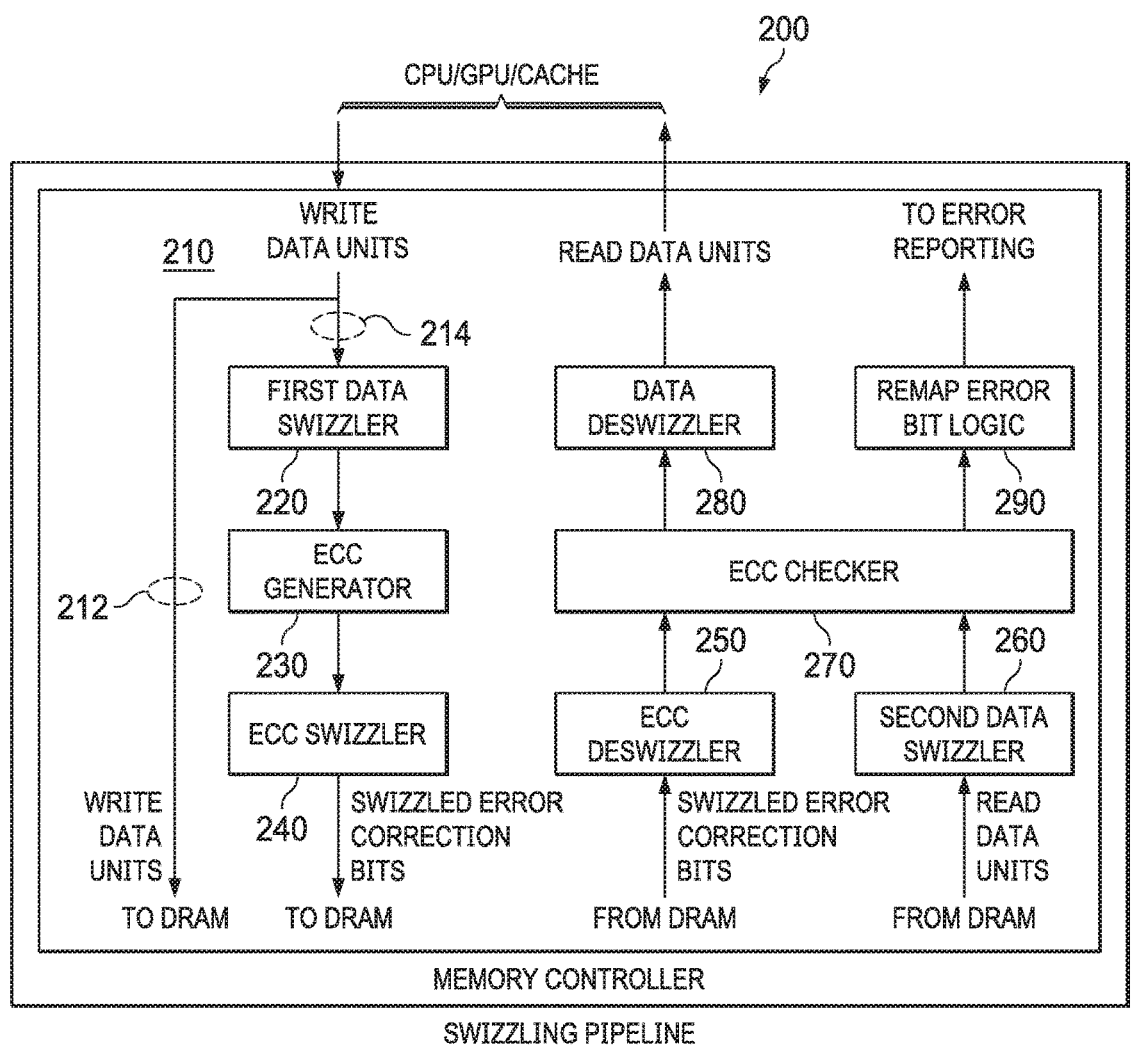
FIG. 2A illustrates a block diagram of an example of a memory controller constructed according to the principles of the disclosure.
Figure 2B:
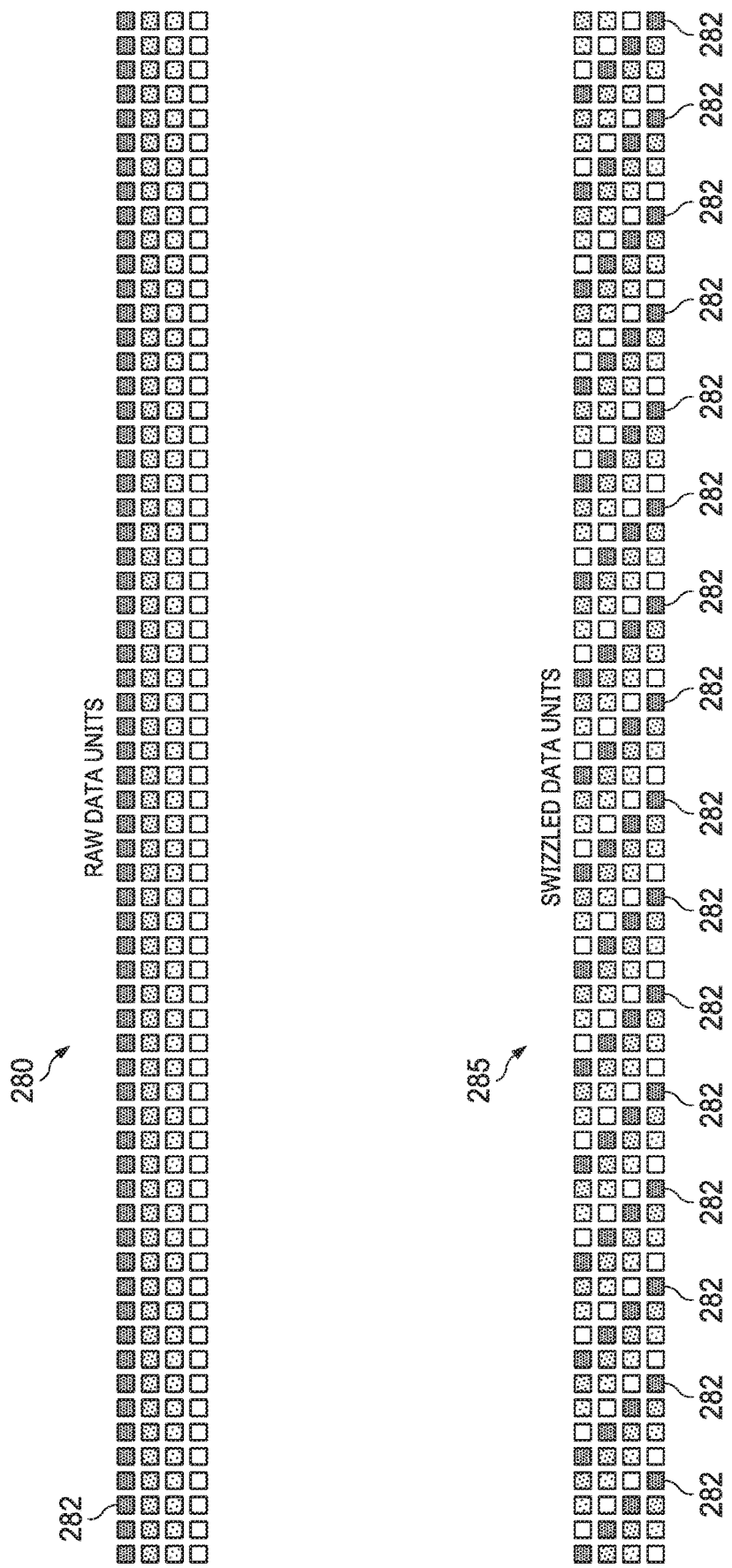
Figure 2C:
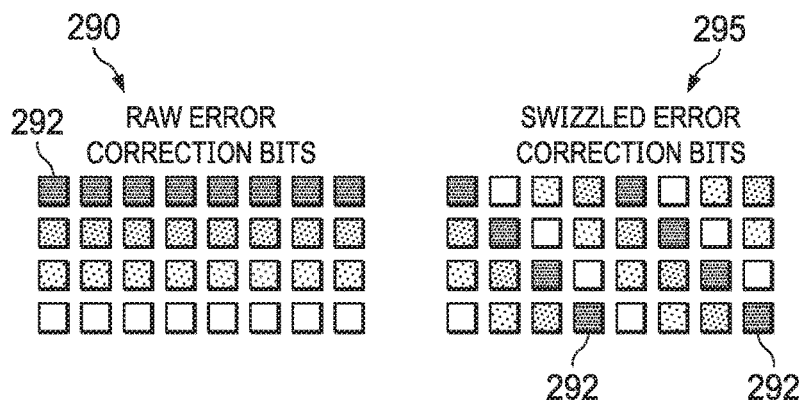
Figure 3:
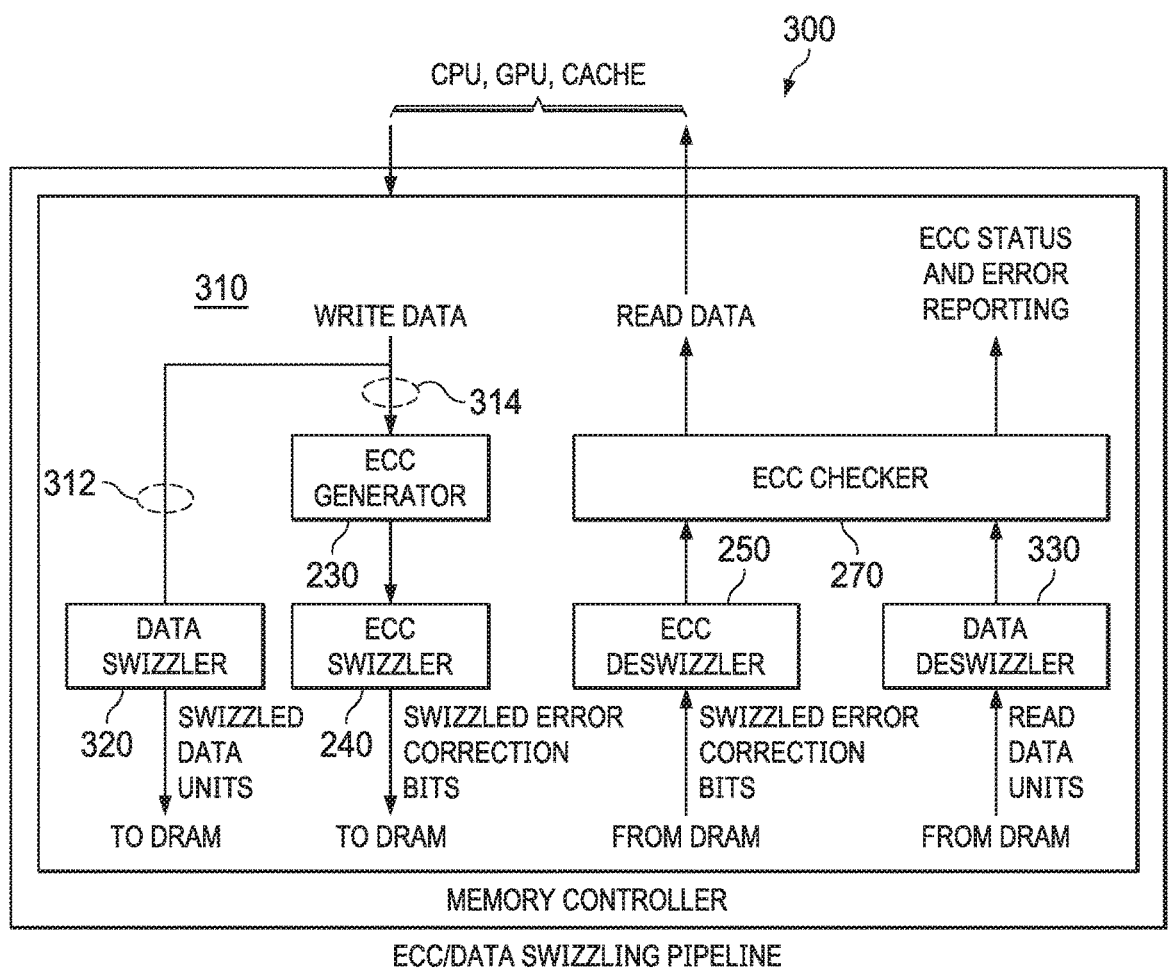
Figure 4A:
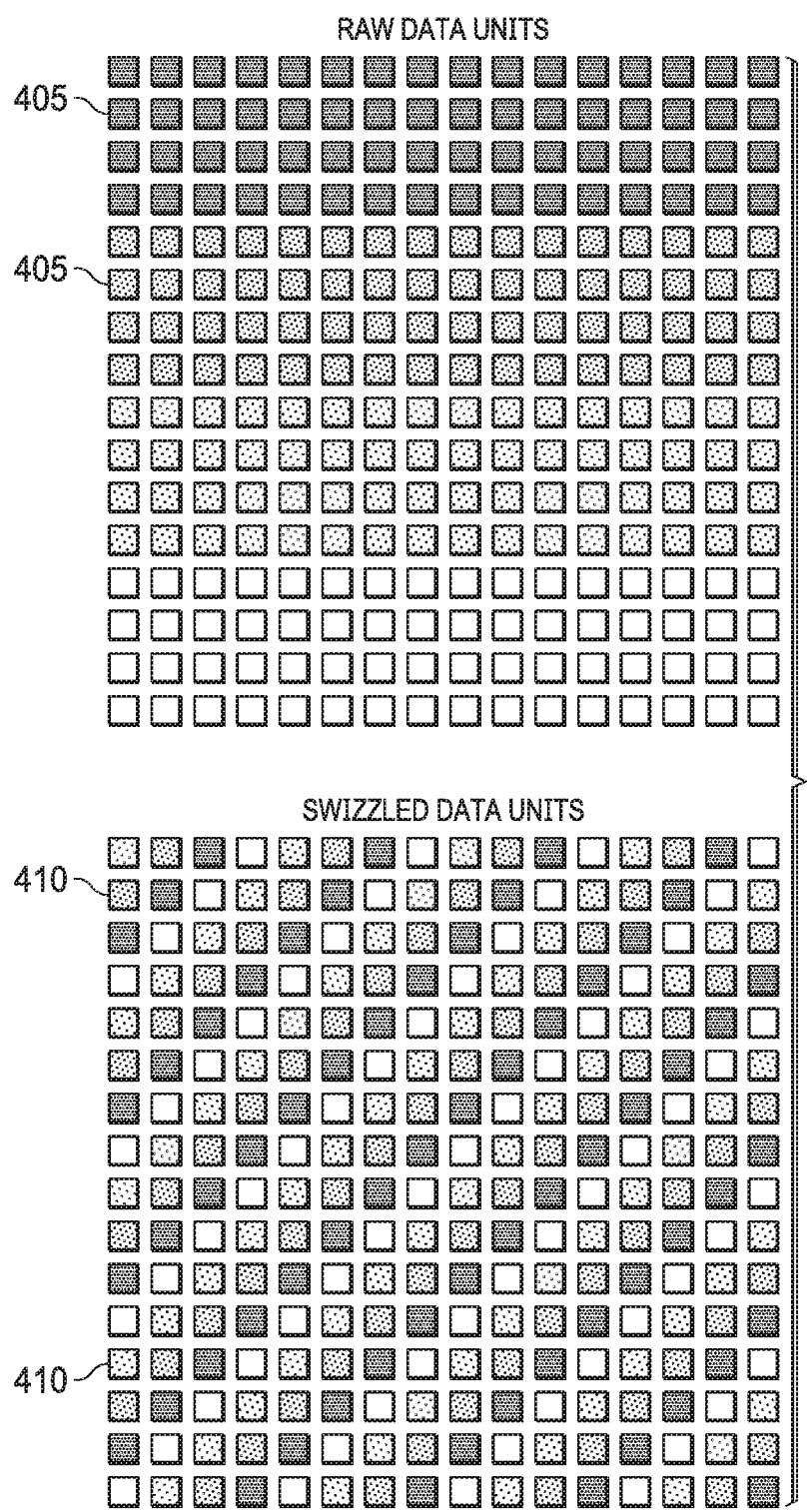
Figure 4B:
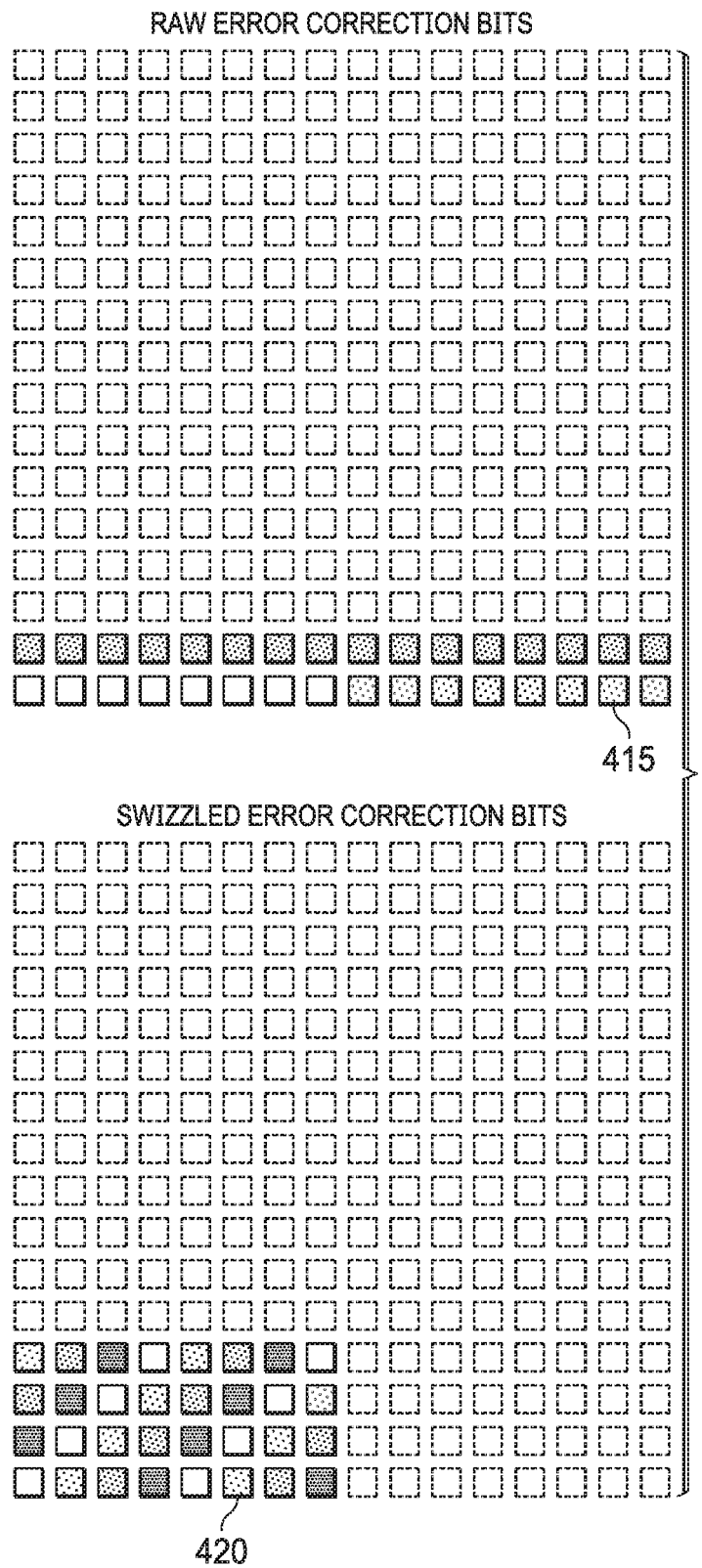
Figure 5:
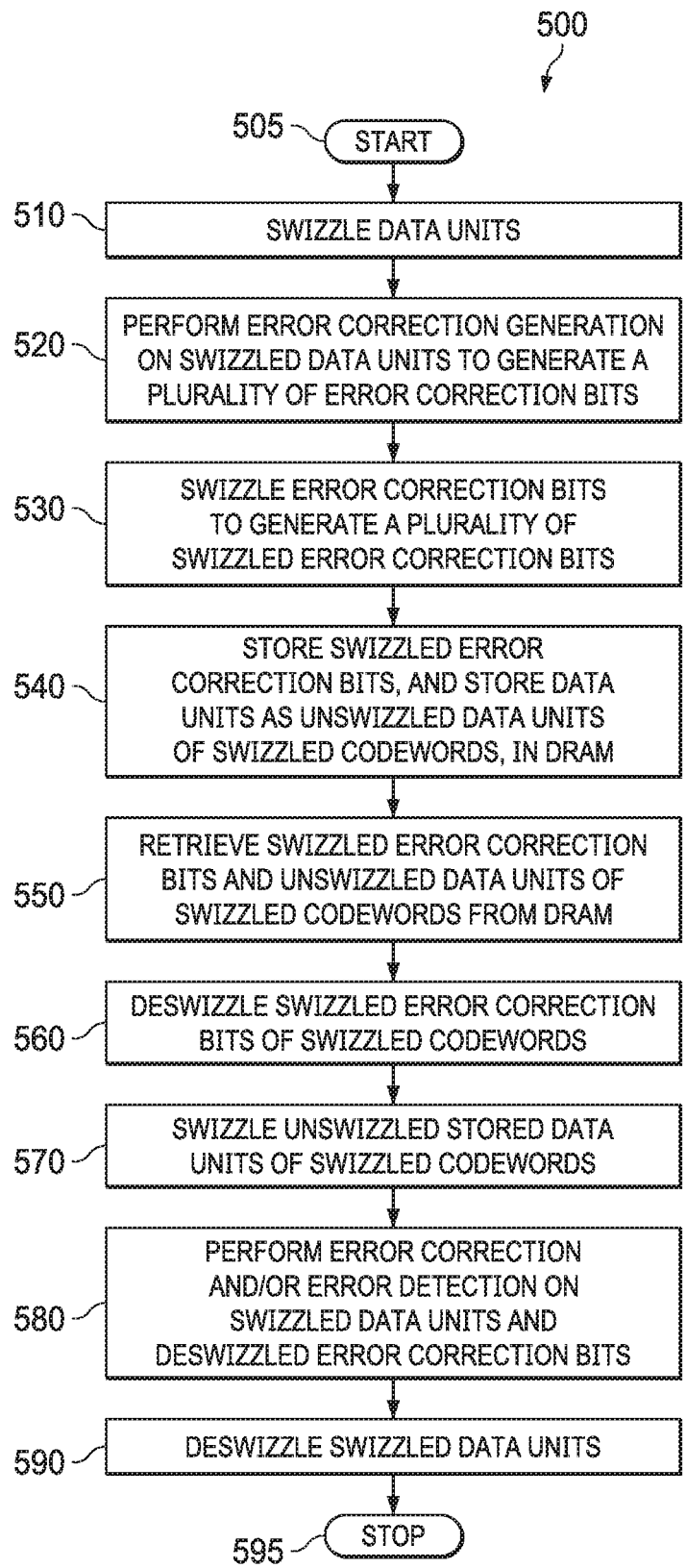
Figure 6:
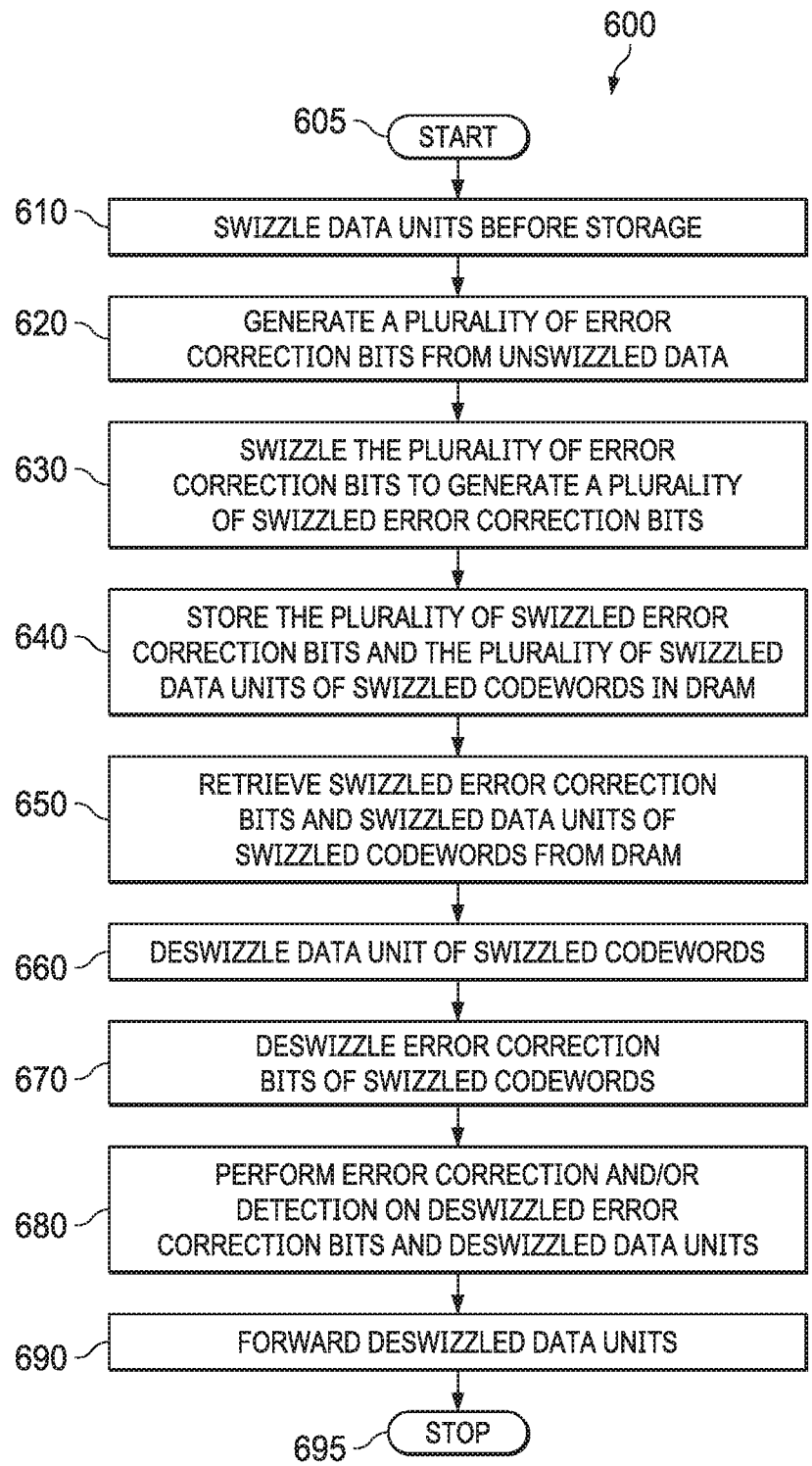

FIG. 2B provides an example of swizzling a burst of data according to the principles of the disclosure;

FIG. 2C provides an example of swizzling error correction bits according to the principles of the disclosure;

FIG. 3 illustrates a block diagram of another example of a memory controller constructed according to the principles of the disclosure;

FIG. 4A illustrates another example of swizzling a burst of data according to the principles of the disclosure;

FIG. 4B illustrates another example of swizzling error correction bits according to the principles of the disclosure;

FIG. 5 illustrates a flow diagram of an example method of swizzling and deswizzling error correction bits of swizzled codewords carried out according to the principles of the disclosure; and FIG. 6 illustrates a flow diagram of an example method of swizzling a plurality of data units and error correction bits of swizzled codewords carried out according to the principles of the disclosure.

DETAILED DESCRIPTION

As noted above, ECCs are used for detecting and correcting errors concerning data stored in memory, such as DRAM. The errors can be bit errors and in some instances can cause byte-mode failures. A byte-mode failure can occur, e.g., when a control signal to a byte in a memory does not operate correctly and the entire byte of data is therefore returned as either all "0's" or all "1's". Other types of errors are also possible. In conventional approaches, this byte-mode failure can result in double error detected (DED) error notification, mis-correction of the data which corrupts it further, or no detection resulting in not even reporting the error. Accordingly, the disclosure provides a way of spreading, organizing and dispersing data, including error correction bits generated by ECC, over multiple codewords to create swizzled codewords in such a manner as to ameliorate the impact of multi-bit memory failures, such as byte-mode failures, as will be explained below.

Generally, the disclosure is directed to a plurality of error correction architectures that employ swizzling of data across multiple codewords to ameliorate the impact of memory failures. "Swizzling" can generally be defined as the reversible swapping of bits between different codewords or between different bytes of data. Swizzling as used herein can be performed before corresponding error correction bit generation. According to the principles of the disclosure, swizzling is used to rearrange the order of bits and distribute or interleave them through different codewords.

There are various types of swizzling that can be employed, such as vertical, horizontal or diagonal swizzling. In vertical swizzling, there is an exchange of bits between different bursts of data at the same bit position. In horizontal swizzling, there is an exchange of bits within a burst of data, but not between bursts of data. In diagonal swizzling there is an exchange of bits between both the bursts of data and bit positions. Various embodiments of diagonal swizzling are provided below as examples.

Generally, a "burst" is a specific amount of data sent or received in an intermittent operation. FIGS. 2B and 4A provide examples of different bursts discussed herein. FIG. 2B illustrates a burst of four beats of raw data wherein each beat is eight bytes. FIG. 4A illustrates a burst of sixteen beats and a length of sixteen bits (two bytes).

The improved error detection and correction disclosed herein can be used with various types of ECC. Generally, if ECC can detect "x" number of bit errors, then the number of bits to be checked would be considered a group of concern, and swizzling datawords with a concerned group of 8-bits, would employ four datawords (i.e., 8/2=4 datawords).

Consider for example an error correction architecture that employs a SECDED code. If a byte error occurs that affects up to 8 bits in a memory, swizzling is advantageously employed such that the byte error only affects up to, at most, two bits per each codeword. This allows improved error correcting and detecting without requiring a change to existing SECDED error correcting code generators and checkers.

Figure 1:
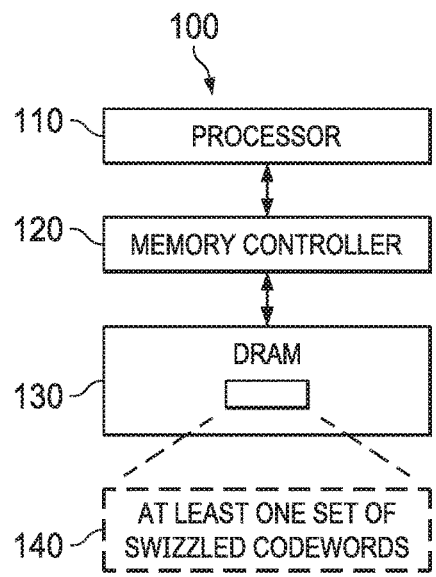
FIG. 1 illustrates a block diagram of an embodiment of a computer system including a memory controller constructed according to the principles of the disclosure.

FIG. 1 illustrates a block diagram of an embodiment of a computer system 100 including a memory controller 120 constructed according to the principles of the disclosure. The computer system 100 further has a processor 110 and a DRAM 130 coupled to the memory controller 120. The computer system 100 can include additional components that are not illustrated but are typically included in conventional computer systems, such as an I/O controller coupled to the memory controller 120.

The processor 110 can be a conventional processor that writes data to and requests data from the DRAM 130. The processor 110 can be a CPU, a GPU, or can include both a CPU and GPU. The processor 110 communicates data writes and requests to the DRAM 130 through the memory controller 120. The memory controller 120 is configured to retrieve data units from the DRAM 130 for processing and send data units to the DRAM 130 for storage. The memory controller 120 can include a processor, clock generators, and a data controller for communicating data units to the DRAM 130. The memory controller 120 can be included on a system on chip (SOC), such as included on a Tegra® IC from NVIDIA Corporation of Santa Clara, Calif. The memory controller 120 can also be another type of an electronic component or integrated circuit, such as, other components or circuits that lack a central processing unit (CPU) but have memory interfaces. Some examples include an integrated circuit such as an application-specific integrated circuit (ASIC) and a field-programmable gate array (FPGA).

A data unit can be generally defined as contiguous bits of data, such as a byte of data. A swizzled codeword may have its data unit swizzled, its error bits swizzled, or both of its data unit and error bits swizzled. Moreover, the swizzled codeword may have its data unit, whether swizzled or unswizzled, stored contiguously or separately from its correlated error correction bits, whether swizzled or unswizzled. Swizzled error correction bits can be generally defined as a set of error correction bits associated with a data unit, wherein the data unit may or may not have been previously swizzled, that have at least some constituent bits swizzled with other error correction bits associated with another data unit, that also may or may not have been previously swizzled. The memory controller 120 is configured to generate error correction bits with employment of ECC for error correction when communicating data to the DRAM 130. The error correction can be SECDED-based error correction. The memory controller 120 is configured to take advantage of a burst format of an ECC generator for improved handling of byte errors. In one example, the memory controller 120 employs swizzling to distribute 8 ECC bits of a 64/8 codeword across 4 data beats. Therefore, as will be explained in more detail below, in this example there will not be more than 2 bits from any ECC calculation stored together in any single byte in the DRAM 130. This swizzling by the memory controller 120 advantageously allows for a byte failure of the DRAM 130 to be detected by error detection code, such as a SECDED error detection code. Normally, SECDED codes cannot guarantee detection of byte failures.

Advantageously, by swizzling as disclosed herein an improvement in the error detection occurs without changing decoding circuitry. In some embodiments, a further advantage of the swizzling by the memory controller 120, such as in FIGS. 2B and 2C, is that there is no more than a single bit of information for each swizzled codeword on any single DQ pin of the DRAM 130. This retains the single-bit error limitation when a DQ pin of the DRAM 130 is stuck at a value, thus allowing full correction of the data on this pin.

The DRAM 130 includes a portion 140 that has stored within it at least one set of swizzled codewords received from the memory controller 120. The set of swizzled codewords can be swizzled SECDED codewords such as SECDED 64/8 codewords.

As will be discussed below, in one embodiment, the memory controller 120 "swizzles" portions, e.g. bits, of an error correction code of a codeword, such as SECDED codewords, to create a swizzled codeword. In one example, SECDED ECC is arranged as a 4 beat 64/8 data_ecc pattern.

FIG. 2A illustrates a block diagram of a memory controller 200 constructed according to the principles of the disclosure. The memory controller 200 can be, for example, the memory controller 120 of FIG. 1. The memory controller 200 includes an ECC swizzler architecture 210 that will also be discussed in reference to FIG. 2B and FIG. 2C. The memory architecture 210, or at least a portion thereof, can be implemented in a processor of the memory controller 200. The memory controller 200 can also include additional components, such as clock generators, that are typically included with a memory controller.

In the ECC swizzler architecture 210, data units are received for processing and delivery to a memory for storage. The memory can be a DRAM, such as DRAM 130, and will be used as an example. The data can be received from a processor, a cache, or other device, e.g., the processor 110 of FIG. 1. In the illustrated embodiment, the data is received using multiple beats over a data bus that is 64 bits wide, with the swizzing performed in parallel. A data bus of other data widths can be used. The received data is then copied down two parallel paths. A first copy of the data is sent to DRAM via a first path 212 as a data unit or data units. Via a second path 214, a coupled first data swizzler 220 swizzles the data, such as write data, as will be illustrated in FIG. 2B, and then forwards the swizzled data, i.e., a swizzled data unit or swizzled data units, to a coupled ECC generator 230.

The coupled ECC generator 230 creates error correction bits based upon an error correction code from a received swizzled data unit from the first data swizzler 220. The error correction code can be created according to SECDED protocols, although other error correction codes are possible. One example of a result of such a protocol is 8 error correction bits of a 64/8 code word. In one embodiment, the coupled ECC generator 230 is four generators, or in an alternative use, the same ECC generator 230 can be sequentially employed four times.

An ECC swizzler 240 then receives the error correction bits from the ECC generator 230 and swizzles the error correction bits to provide swizzled error correction bits, which was itself based off of a swizzled data unit. From the ECC swizzler 240, swizzled error correction bits are sent to a first and a second area of the DRAM, respectively.

When reading data from the DRAM, the swizzled error correction bits are sent to an ECC deswizzler 250, wherein the swizzled error correction bits are deswizzled and sent to an ECC checker 270. Deswizzling is the reverse of swizzling. A second data swizzler 260 receives the stored data unit of the swizzled codeword, wherein the data unit was not itself previously swizzled in this embodiment, then swizzles the data units, and then also sends the swizzled data unit to the ECC checker 270. The ECC checker 270 can be a SECDED checker. In one embodiment, the coupled ECC checker 270 is four error checkers, or in an alternative use, the same ECC checker 270 employed four times sequentially.

The ECC checker 270 employs both the deswizzled error correction bits previously of the plurality of swizzled codewords, and the recently-generated swizzled data units, to generate checked error correction bits. The ECC checker 270 performs as a conventional ECC checker on the deswizzled error correction bits and the swizzled data units, but due to the previous swizzling and deswizzling, can generate more accurate results. The ECC checker 270 then sends the swizzled data units to a data deswizzler 280 to deswizzle the data units. The checked error correction bits are sent to a remapper 290 and from there to error reporting, such as to report SECDED status. The error reporting can be sent out of the ECC swizzler architecture 210 for processing.

FIG. 2B illustrates an example of a diagram of a burst of four beats of raw data 280 and swizzled data 285. The raw data 280 is the data unit of 64/8 codewords. The raw data 280 can be write data, and the swizzled data 285 can be the swizzled data generated by the first data swizzler 220 from the raw data 280. The swizzled data 285 represents diagonal swizzling of the raw data 280. To represent the data swizzling, one beat of the raw data 280 is designated as data 282 and is denoted as part of the swizzled data 285.

The data swizzling in this example is a (base+65)%256 pattern:
Data_to_ecc_gen[63:0]=original_data[255, 190, . . . , 65, 0];
Data_to_ecc_gen[127:64]=original_data[63, 254, . . . , 129, 64];
Data_to_ecc_gen[191:128]=original_data[127, 253, . . . , 193, 128];
Data_to_ecc_gen[255:192]=original_data[191, 126, . . . , 1, 192].
However, other patterns for swizzling are also employable.

In the data swizzler architecture 210, unlike the swizzled data of the ECC swizzler architecture 310 (to be discussed below with respect to FIG. 3), the data is swizzled when generating or checking the error correction bits within the data swizzler architecture 210, although they are nonetheless still considered part of swizzled codewords. The data units being written to the DRAM, however, can remain non-swizzled. This advantageously allows the DRAM characterization patterns which have been previously developed to continue being used without any alteration.

Moreover, in the ECC swizzler architecture 210, because the implementation of the data swizzler architecture 210 does not swizzle the DQ bits to the DRAM, the programmed error injection bit will match the DQ pin. Hardware will map the reporting error bit into the correct DQ pin, so the injected bit position will match the reported bit position.

FIG. 2C provides an example of swizzling of error correction bits that occurs in the ECC swizzler 240.

The swizzled ECC can be from using four 64/8 codewords and a SECDEC protocol. Raw error correction bits 290 and swizzled error correction bits 295 are illustrated. A single beat of the raw error correction bits 290 is denoted as 292 and identified in the swizzled error correction bits 295 to illustrate the swizzling. As with the swizzling illustrated in FIG. 2B, the swizzling in FIG. 2C is also diagonal swizzling. In the swizzler architecture 210, the first data swizzler 220 swizzled the data units before the swizzled data units are received and employed by the ECC generator 230.

In the ECC swizzler 240, the error correction bits of a plurality of codewords are swizzled between each of the ECC bits of the plurality of codewords to allow the error correction bits to be distributed over different bytes of DRAM, e.g. bytes corresponding to Beat0, Beat1, Beat 2, Beat 3, of the error correction bits of the codewords.

Following a similar pattern as the swizzling discussed regarding FIG. 2B, each burst begins with its original bit index and then uses every 9th bit afterward. The sequence of bits within each burst becomes a (base+9)%32 pattern such as:
ecc_out[7:0]=original_ecc[31, 22, 13, 4, 27, 18, 9, 0];
ecc_out[15:8]=original_ecc[7, 30, 21, 12, 3, 26, 17, 8];
ecc_out[23:16]=original_ecc[15, 6, 29, 20, 11, 2, 25, 16];
ecc_out[31:24]=original_ecc[23, 14, 5, 28, 19, 10, 1, 24].
However, other patterns for swizzling are also employable.

FIG. 3 illustrates a block diagram of another example of a memory controller 300 constructed according to the principles of the disclosure. The memory controller 300 includes an alternative embodiment of a data swizzler architecture 310. Generally, in contrast to the data swizzler architecture 210, the data swizzler architecture 310 swizzles the data units for storage, as well as swizzling the error correction bits based upon ECC codes, and then the corresponding swizzled codeword is stored in a suitable storage medium, such as in DRAM. Upon retrieval, both the swizzled data and the swizzled error correction bits are deswizzled prior to ECC checking. However, the data units which are employed to generate the error correction bits by the ECC generator 230 was not itself previously swizzled.

In the data swizzler architecture 310, data units are received from a processor, such as processor 110, a cache, or other device that generates or stores data. In the illustrated embodiment, the data is 64 bits wide, although other data widths are possible.

The data is then copied down two parallel paths. A first copy of the data is sent via a first path 312 to a data swizzler 320 to be swizzled, and from there to a suitable memory device such as DRAM, in this embodiment the DRAM 130. Via a second path 314, a second copy of the data is sent to a coupled ECC generator 230, which then receives the data and creates an error code from the data, such as according to SECDED protocols. The error code can be an 8 bit ECC portion of a 64/8 codeword. The plurality of error correction code bits are then forwarded to the ECC swizzler 240. The ECC swizzler 240 swizzles the plurality of error correction bits of the swizzled codewords. Both the swizzled data unit and the swizzled error correction bits are forwarded to portions of a DRAM, such as the DRAM 130.

Upon a retrieval of data from the DRAM, the swizzled error correction bits of the swizzled codewords are then deswizzled in an ECC deswizzler 250; and the swizzled data unit of the swizzled codewords is deswizzled in a data deswizzler 330.

These deswizzled bits and deswizzled data units are checked in the ECC checker 270. The ECC checker 270 then sends both the deswizzled data units and ECC status out of the data swizzler architecture 310, such as to a CPU, GPU or cache. In the data swizzler architecture 310, the data can be swizzled to help detect DRAM byte errors. The swizzling of the data can follow a 64-bit pattern, e.g, the width of the data bus.

FIGS. 4A and 4B illustrate an alternative aspect of a swizzling of data units and error correction bits for lower power double rate memory devices (LPPDR) embodiment of the DRAM 130. In FIGS. 4A and 4B, each burst consists of 16 beats.

LPDDR devices (LPDDR4, LPDDR4X, LPDDR5, etc.) generally have a 16-bit channel width and a burst length of 16, as compared to the 64-bit width and burst length of 4 on high bandwidth memory, such as discussed in FIGS. 2A and 3.

In LPDDR, there are no extra interface or memory bits for reading and writing error correction bits simultaneously with the data, known as "parallel ECC" such as employed in FIGS. 2A and 3. Consequently, on various chips which utilize LPDDR, such as Tegra®, an "inline ECC" is implemented. In other words, a second memory access is issued at a different address to read or write the error correction bits before or after the data is read or written. However, since the error correction bits corresponding to the ECC is much smaller than the data, a 16-bit burst length (BL16) read from the ECC region can cover a number of data reads. Typically, the 16-bit BL16 access is the minimum size allowed by the DRAM.

A minimum size of memory access at the system level is often referred to as an "atom". In chips which utilize LPDDR, such as Tegra® chips, an atom is 32 bytes, matching the minimum DRAM access. In this example embodiment, the ECC is 4 Bytes, so one ECC access can cover up to eight data accesses.

Like aspects of the swizzling scheme used for high bandwidth memory (HBM), such as discussed in FIG. 2A and FIG. 2B, this embodiment uses four SECDED ECC swizzled codewords, both swizzled data units and swizzled error correction bits. These error correction bits of swizzled codewords are striped "diagonally" through the burst, similar to the HBM embodiment discussed in ECC swizzler architecture 210 and 310. For example, see memory section 410 showing swizzled data unit from raw data 405 of FIG. 4A, and swizzled error correction bits 420 from raw ECC 415 of FIG. 4B.

Again, similar to SECDED as described for HBM in FIGS. 2A and 3, for SECDED, there is byte-error detection and nibble-error correction. Indeed, any 8 bit errors which are contiguous in a single beat of the burst can be detected, and any contiguous 4 bit errors in a burst can be corrected. However, unlike HBM embodiment of FIGS. 2A and 3, there is no pin correction capability, because more than four bits are transferred per pin. Employing the LPDDR chip can correct any sequential 4-bit error on a pin and detect any sequential 8-bit error. Similar to the HBM embodiment of FIGS. 2A and 3, it is possible to write the data unchanged and only interleave it at the ECC encoder and decoder, but the error correction bits should be swizzled before being written.

As illustrated in FIGS. 4A and 4B, a layout of four sets of four swizzled codewords is shown, with each line belonging to a codeword. As discussed above, an ECC access of FIG. 4B contains enough error correction bits generated by ECC to cover 8 data accesses. The entire ECC atom depicted on FIG. 4B is transferred to and from the DRAM, but only a 4-byte group like the one shown is used in conjunction with a single data access.

FIG. 5 illustrates a method 500 of employing ECC for accessing data in a memory and swizzling on a plurality of error correction bits created by ECC for a plurality of SECDED swizzled codewords. The method 500, or at least a portion thereof can be performed by an ECC swizzler architecture, such as the ECC swizzler architecture 210 of FIG. 2A. The ECC swizzler architecture can be part of a memory controller that is used to store data in a memory, such as DRAM in the method 500. The method 500 starts in step 505.

In a step 510, bytes of write data units are swizzled. Swizzing of the data units can be, e.g., swizzled among bursts of data containing the data units, and can be performed by a data swizzler, such as the first data swizzler 220. The swizzling can be vertical, horizontal, or diagonal.

In a step 520, an error correction bit generation, such as through employment of SECDED, is performed on the bytes of data units, such as a burst of the swizzled data units, to create a plurality of codewords. In one embodiment, these are four codewords, with a data unit and error bits. These can be formed, for example, by the ECC generator 230.

In a step 530, the error correction bits of the plurality of codewords are swizzled, which was in turn based upon write data that was also previously swizzled. The swizzling of the error correction bits of the plurality of codewords creates a plurality of swizzled codewords. The swizzling of the error correction bits in step 530 can be performed by an ECC swizzler such as the ECC swizzler 240. In one embodiment, the swizzling of error correction bits occurs diagonally between swizzled codewords, such as four swizzled codewords. Other types of swizzling can also be used.

In a step 540, the swizzled error correction bits and corresponding unswizzled data units of the swizzled codewords are stored in DRAM, such as the DRAM 130. Using FIG. 2A as an example, the data units, which have not been swizzled, can be conveyed through the first path 212 to the memory. The swizzled error correction bits and the corresponding data units, which are not swizzled, of the plurality of swizzled codewords are retrieved from DRAM in a step 550. The DRAM, for example, can be the DRAM 130.

In a step 560, the error correction bits of the plurality of swizzled codewords are deswizzled. An ECC deswizzler such as the ECC deswizzler 250 can be used for deswizzling the error correction bits.

In a step 570, the retrieved data units, which were not swizzled, of the swizzled codewords are then swizzled. A data swizzler, such as the second data swizzler 260 can be used for the swizzling in step 570.

In a step 580, an error correction and/or error detection are performed with the swizzled data unit and the deswizzled ECC bits. Error code checking information generated from step 580 can be conveyed for further processing. For example, an ECC checker such as by the ECC checker 270 disclosed herein can be used for step 580 and the results sent to remap error bit logic 290.

The method 500 continues to step 590 wherein the swizzled data units is deswizzled. The deswizzled data can be deswizzled and conveyed for further processing. For example, the data can be deswizzled by the data deswizzler 280 and conveyed outside of a memory controller in response to a read request. The method ends in stop step 595.

FIG. 6 illustrates a method 600 of employing ECC for accessing data in a memory and swizzling on a data unit of a plurality of SECDED codewords to create SECDED swizzled codewords. The method 600, or at least a portion thereof, can be performed by an ECC swizzler architecture, such as the ECC swizzler architecture 310 of FIG. 3. The ECC swizzler architecture can be part of a memory controller that is used to store data in a memory, such as DRAM in the method 600. The method 600 starts in start step 605.

In a step 610, data of a plurality of data units are swizzled and stored. This can be performed by the data swizzler 320. The swizzling can be vertical, horizontal, or diagonal.

In a step 620, error correction bits are generated from data units, wherein the data units are not swizzled. An ECC generator, such as the ECC generator 230 of the ECC swizzler architecture 310, can generate the error correction bits.

In a step 630, the error correction bits are swizzled. The swizzling can be one of the various types of swizzling described herein. An ECC swizzler, such as the ECC swizzler of the ECC swizzler architecture 310 can perform the swizzling.

In a step 640, the swizzled error correction bits, generated by data units that were not swizzled, and the swizzled data unit of the swizzled codewords are stored in DRAM. The DRAM can be a memory such as the DRAM 130.

In a step 650, the swizzled error correction bits that were generated by unswizzled data, and the swizzled data unit of the swizzled codewords are retrieved from DRAM. The retrieved swizzled data units of the swizzled codewords are deswizzled in a step 660. A data deswizzler such as the data deswizzler 330 can be used for the deswizzling of the swizzled data units.

In a step 670, the retrieved error correction bits of the swizzled codewords are deswizzled. An ECC deswizzler such as the ECC deswizzler 250 of FIG. 3 can be used for the deswizzling.

In a step 680, an error correction and/or error detection are performed with the deswizzled data unit and the deswizzled ECC bits of the codewords. An ECC checker, such as the ECC checker 270 can perform the error correction and/or detection.

In a step 690, the deswizzled data unit is forwarded. For example, the deswizzled data unit can be conveyed outside of a memory controller in response to a read request. After this step, the method 600 continues to a stop step 695 and ends.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. An error correction code (ECC) apparatus, comprising:
  a first data swizzler configured to swap bits among a plurality of data units to form a plurality of swizzled data units, wherein the swapping of bits includes exchanging bits between different data units at a same bit position;
  an ECC generator configured to generate a plurality of error correction bits, at least one error correction bit of the plurality of error correction bits generated from the plurality of swizzled data units received from the first data swizzler;
  an ECC swizzler configured to swap bits among the plurality of error correction bits to form a plurality of swizzled error correction bits thereby forming a plurality of swizzled codewords, wherein each swizzled codeword includes one of the plurality of data units and at least one swizzled error correction bit of the plurality of swizzled error correction bits;
  a first dynamic random access memory (DRAM) area for storing the plurality of data units of the plurality of swizzled codewords;
  an at least second DRAM area for storing the plurality of swizzled error correction bits of the plurality of swizzled codewords;
  a second data swizzler configured to swizzle the plurality of data units of the plurality of swizzled codewords, wherein the plurality of data units are retrieved from the first DRAM area;
  an ECC deswizzler configured to deswizzle the plurality of swizzled error correction bits of the plurality of swizzled code words to generate a plurality of deswizzled error correction bits; and
  an ECC checker configured to check for, from an employment of the plurality of the swizzled data units from the second data swizzler and the plurality of deswizzled error correction bits from the ECC deswizzler, a single bit error condition, and/or detect a single bit error condition or double bit error condition.

2. The ECC apparatus of claim 1, wherein the ECC swizzler is configured to swizzle the plurality of error correction bits as a (base+9)%32 pattern.

3. The ECC apparatus of claim 1 wherein the first data swizzler is configured to swizzle the data units as a (base+65)%256 pattern.

4. The ECC apparatus of claim 1, wherein the plurality of swizzled codewords are four swizzled codewords.

5. The ECC apparatus of claim 1, wherein the error code correction is a single error correction double error detection (SECDED) error code correction.

6. A memory controller that employs an error correction code (ECC), comprising:
  a data swizzler configured to generate a plurality of swizzled data units from a plurality of data units;
  an ECC generator configured to generate a plurality of error correction bits from the plurality of data units;
  an ECC swizzler configured to generate a plurality of swizzled error correction bits from the plurality of error correction bits by swapping bits among the plurality of error correction bits, wherein the swapping of bits includes exchanging bits between different error correction bits at a same position thereby forming a plurality of swizzled codewords, wherein each swizzled codeword includes one of the plurality of swizzled data units and at least one swizzled error correction bit of the plurality of swizzled error correction bits;
  a data deswizzler configured to deswizzle the plurality of swizzled data units stored in at least a first dynamic random access memory (DRAM) area to generate a plurality of deswizzled data units;
  an ECC deswizzler configured to deswizzle the plurality of swizzled error correction bits stored in at least a second DRAM area to generate a plurality of deswizzled error correction bits; and
  an ECC checker configured to correct a single bit error condition and/or detect a double bit error condition, employing both the plurality of deswizzled data units and the plurality of deswizzled error correction bits, when either of these error conditions are present.

7. The memory controller of claim 6, wherein the ECC swizzler is configured to swizzle the plurality of error correction bits as a (base+9)%32 pattern.

8. The memory controller of claim 6 wherein the data swizzler is configured to swizzle the plurality of data units as a (base+65)%256 pattern.

9. A method, comprising:
  swizzling a plurality of data units to generate a plurality of swizzled data units;
  performing error correction coding on the swizzled data units to create a plurality of error correction bits;
  swapping the bits among the plurality of error correction bits to generate a plurality of swizzled error correction bits, wherein the swapping of bits includes exchanging bits between different error correction bits at a same bit position;
  storing the plurality of data units and the plurality of swizzled error correction bits, wherein the storing creates a plurality of swizzled codewords;
  deswizzling the plurality of swizzled error correction bits of the plurality of swizzled code words to generate a plurality of deswizzled error correction bits, wherein the plurality of swizzled error correction bits was stored in and retrieved from a dynamic random access memory (DRAM);
  swizzling the plurality of data units of the plurality of swizzled code words to generate a plurality of swizzled data units, wherein the plurality of data units was stored in and retrieved from the DRAM; and
  performing error correction and/or error detection on the plurality of swizzled data units and the plurality of deswizzled ECC bits.

10. The method of claim 9, further comprising deswizzling the swizzled data units to generate a plurality of deswizzled data units and conveying the plurality of deswizzled data units in response to a read request of a memory.

* * * * *